(12) United States Patent
Wang et al.

(10) Patent No.: US 10,175,419 B2
(45) Date of Patent: Jan. 8, 2019

(54) BACKLIGHT MODULE AND DISPLAY DEVICE

(71) Applicant: Young Lighting Technology Inc., Hsin-Chu (TW)

(72) Inventors: Chih-Yang Wang, Hsin-Chu (TW); Chun-Chi Hsu, Hsin-Chu (TW); Bing-Han Tsai, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 2 days.

(21) Appl. No.: 15/593,269

(22) Filed: May 11, 2017

(65) Prior Publication Data
US 2018/0039016 A1    Feb. 8, 2018

(30) Foreign Application Priority Data

Aug. 4, 2016    (CN) .................... 2016 2 0835778 U

(51) Int. Cl.
*F21V 7/04* (2006.01)
*F21V 8/00* (2006.01)

(52) U.S. Cl.
CPC ........... *G02B 6/0088* (2013.01); *G02B 6/005* (2013.01); *G02B 6/0053* (2013.01); *G02B 6/0055* (2013.01); *G02B 6/0068* (2013.01); *G02B 6/0076* (2013.01)

(58) Field of Classification Search
CPC ............. F21V 7/04; G06F 13/04; G06F 13/08
USPC .............. 362/607, 606, 600, 613, 97.1, 97.2
See application file for complete search history.

(56) References Cited

U.S. PATENT DOCUMENTS

| | | | | |
|---|---|---|---|---|
| 7,001,059 B2* | 2/2006 | Han | ..................... | G02B 6/0088 362/561 |
| 2006/0071231 A1* | 4/2006 | Han | ........................ | G02B 5/02 257/103 |
| 2006/0164829 A1* | 7/2006 | Jang | ....................... | G01D 11/28 362/225 |
| 2009/0122476 A1* | 5/2009 | Won | ................... | G02F 1/133308 361/679.21 |
| 2011/0205756 A1* | 8/2011 | Kim | ..................... | G02B 6/0053 362/607 |
| 2013/0033901 A1* | 2/2013 | Nishitani | ............. | G02B 6/0036 362/613 |

(Continued)

FOREIGN PATENT DOCUMENTS

| | | |
|---|---|---|
| TW | I321694 B | 3/2010 |
| TW | I322313 B | 3/2010 |

(Continued)

*Primary Examiner* — Edwyn Labaze
(74) *Attorney, Agent, or Firm* — Cheng-Ju Chiang

(57) ABSTRACT

A backlight module includes first and second backlight units. The first backlight unit includes a first cover, a first light guide plate, a first light source and at least one first optical film. The first cover has a first surface and a second surface opposite to each other. The first light guide plate is disposed on the first surface. The first light source is disposed on the first surface and located on a side of the first light guide plate. The first optical film is disposed between the first surface and the first light guide plate. The second backlight unit is detachably disposed with the first backlight unit and has a structure similar to the first backlight unit. A display device having the backlight module is also provided.

12 Claims, 7 Drawing Sheets

(56) References Cited

U.S. PATENT DOCUMENTS

| | | | | |
|---|---|---|---|---|
| 2013/0162503 A1* | 6/2013 | Chen | ............... | G09G 5/10 |
| | | | | 345/1.3 |
| 2014/0085569 A1* | 3/2014 | Choi | ............... | G02F 1/133606 |
| | | | | 349/64 |
| 2014/0085570 A1* | 3/2014 | Kuwata | ............... | G02B 6/0053 |
| | | | | 349/65 |
| 2015/0003105 A1* | 1/2015 | Goto | ............... | G02B 6/0038 |
| | | | | 362/607 |
| 2015/0124478 A1* | 5/2015 | Ohkawa | ............... | G02B 6/0091 |
| | | | | 362/606 |
| 2017/0318695 A1* | 11/2017 | Lee | ............... | H05K 5/03 |

FOREIGN PATENT DOCUMENTS

| | | |
|---|---|---|
| TW | 201250346 A1 | 12/2012 |
| TW | M480692 U | 6/2014 |

* cited by examiner

BACKLIGHT MODULE AND DISPLAY DEVICE

CROSS-REFERENCE TO RELATED APPLICATION

THIS APPLICATION CLAIMS THE PRIORITY BENEFIT OF CN201620835778.9 FIELD ON 2016 Aug. 4. THE ENTIRETY OF THE ABOVE-MENTIONED PATENT APPLICATION IS HEREBY INCORPORATED BY REFERENCE HEREIN AND MADE A PART OF THIS SPECIFICATION.

BACKGROUND OF THE INVENTION

Field of the Invention

The invention relates to a backlight module and a display device, and more particularly to a backlight module and a display device having a switchable viewing angle function.

Description of Related Art

Switchable viewing angle display has been one of the focal points in the development of the display field. Switchable viewing angle display mainly uses an external LCD panel and through changing and controlling the pixels of the LCD panel on and off to achieve the purpose of viewing angle switching. In addition through the way having the external LCD panel, switchable viewing angle display can achieve the purpose of viewing angle switching through disposing two light guide plates in a backlight module, that is, adjust the two light guide plate to emit lights with two different respective viewing angles thereby achieving the switch between narrow viewing angle mode and wide viewing angle mode.

In general, the backlight module having two light guide plates has a structure constituted of the top cover, the first light source, the first optical film group, the first light guide plate, the second light source, the second optical film group, the second light guide plate and the bottom cover which are sequentially stacked and assembled. However, this assembly way cannot inspect the presence of dust and dirt during the assembly process and can only perform the dust and dirt inspection after the completion of assembly. Further, if dust and dirt are found, the assembled backlight module must be dismantled to carry out the dust and dirt cleaning operation, and this repeated dismantling will lead to the increase of the probability of damage. Therefore, how to improve the above-mentioned problem is the focus of attention of the related person in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a backlight module with a structure easy to be dismantled and assembled repeatedly.

Another objective of the invention is to provide a display device having a backlight module with a structure easy to be dismantled and assembled repeatedly.

Other objectives and advantages of the invention can be further illustrated by the technical features broadly embodied and described as follows.

In order to achieve one or a portion of or all of the objects or other objects, the invention provides a backlight module, which includes a first backlight unit and a second backlight unit. The first backlight unit includes a first cover, a first light guide plate, a first light source and at least one first optical film. The first cover has a first surface and a second surface opposite to each other. The first light guide plate is disposed on the first surface. The first light source is disposed on the first surface and located on a side of the first light guide plate. The at least one first optical film is disposed between the first surface and the first light guide plate. The second backlight unit is detachably disposed with the first backlight unit and includes a second cover, a second light guide plate, a second light source and at least one second optical film. The second cover has a third surface and fourth surface opposite to each other. The third surface faces the first surface. The second light guide plate is disposed on the third surface. The second light source is disposed on the third surface and located on a side of the second light guide plate. The at least one second optical film is disposed between the first backlight unit and the second light guide plate.

In order to achieve one or a portion of or all of the objects or other objects, the invention further provides a display device, which includes a first backlight unit, a second backlight unit and a display panel. The first backlight unit includes a first cover, a first light guide plate, a first light source and at least one first optical film. The first cover has a first surface and a second surface opposite to each other. The first light guide plate is disposed on the first surface. The first light source is disposed on the first surface and located on a side of the first light guide plate. The at least one first optical film is disposed between the first surface and the first light guide plate. The second backlight unit is detachably disposed with the first backlight unit and includes a second cover, a second light guide plate, a second light source and at least one second optical film. The second cover has a third surface and fourth surface opposite to each other. The third surface faces the first surface. The second light guide plate is disposed on the third surface. The second light source is disposed on the third surface and located on a side of the second light guide plate. The at least one second optical film is disposed between the first backlight unit and the second light guide plate. The display panel disposed on the second surface of the first cover.

The backlight module and the display device according to the embodiments of the invention include a first backlight unit and a second backlight unit, and the first backlight unit is detachably disposed with the second backlight unit. With this structural design, a defect inspection (for example, an inspection for dust and stain) can be performed after the first backlight unit and the second backlight unit are assembled to each other. Namely, the backlight module of the embodiment of the invention can inspect the defects at any time during the assembling process, so as to avoid the high manufacturing loss rate caused by the repeated dismantling of the components.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
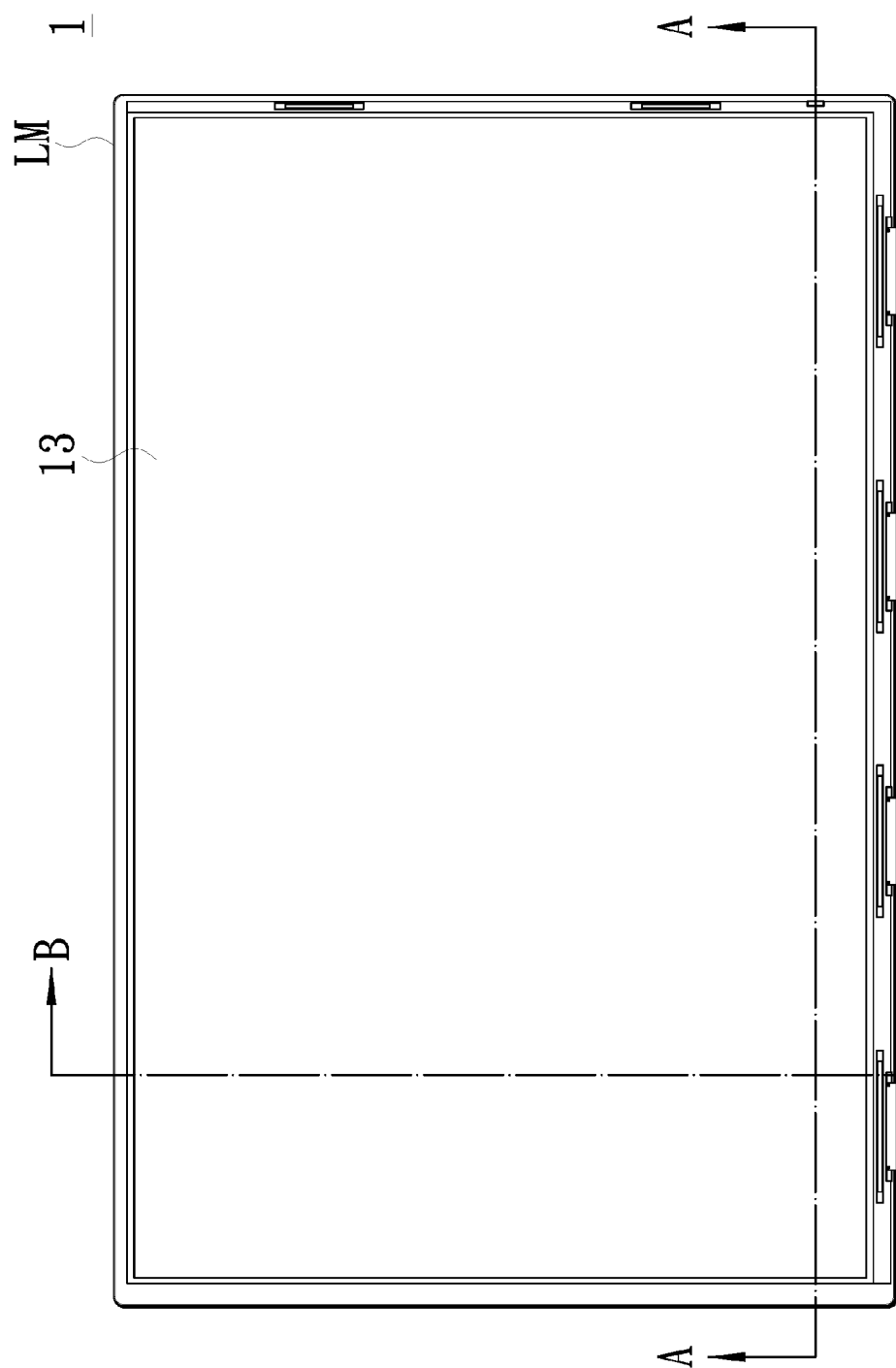
FIG. 1 is a schematic top view of a display device in accordance with an embodiment of the invention.
Figure 2:
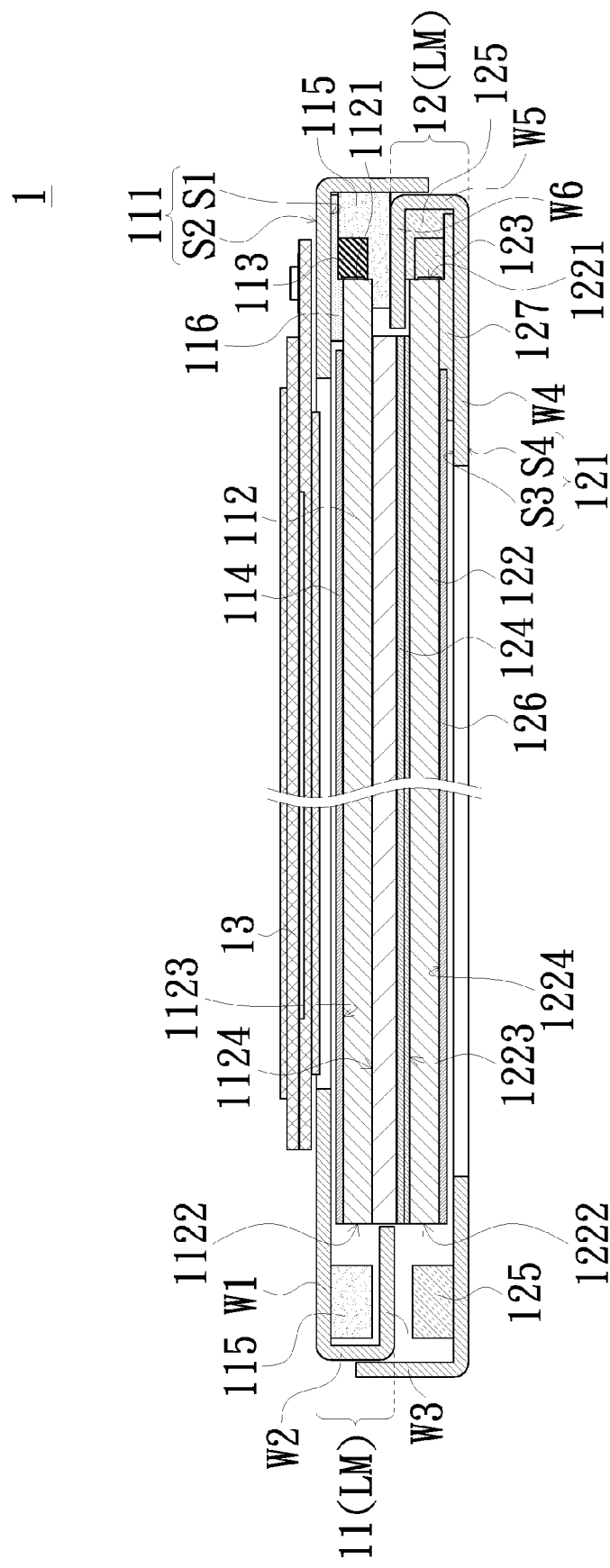
FIG. 2 is a schematic cross-sectional view taken along the line A-A in FIG. 1.
Figure 3:
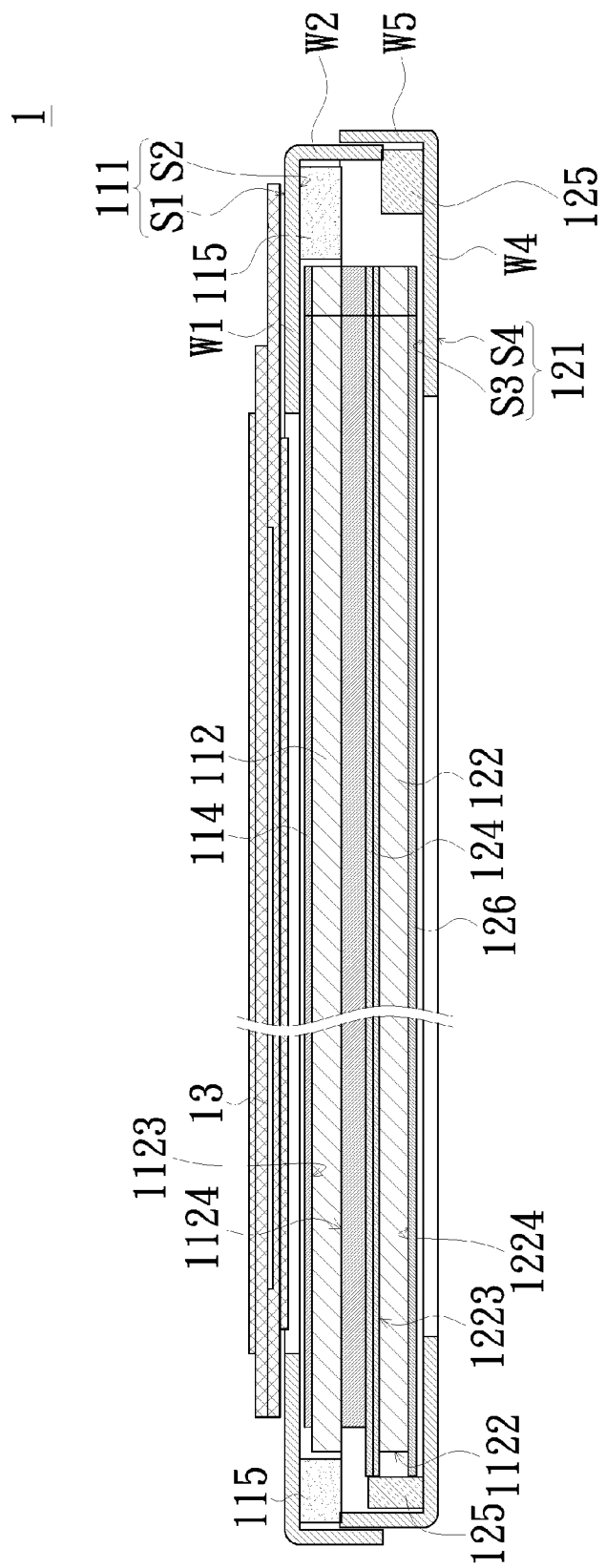
FIG. 3 is a schematic cross-sectional view taken along the line B-B in FIG. 1.

FIG. 1 is a schematic top view of a display device in accordance with an embodiment of the invention. FIG. 2 is a schematic cross-sectional view taken along the line A-A in FIG. 1. FIG. 3 is a schematic cross-sectional view taken along the line B-B in FIG. 1. As shown in FIG. 1 and FIG. 2, the display device 1 of the embodiment includes a first backlight unit 11, a second backlight unit 12 and a display panel 13. The first backlight unit 11 is detachably disposed with the second backlight unit 12 to constitute a backlight module LM. The first backlight unit 11 includes a first cover 111, a first light guide plate 112, a first light source 113 and at least one first optical film 114. The first cover 111 has a first surface S1 and a second surface S2 opposite to each other. The first light guide plate 112 is disposed on the first surface S1 of the first cover 111. The first light source 113 is disposed on the first surface S1 of the first cover 111 and on a side of the first light guide plate 112. The at least one first optical film 114 is disposed between the first surface S1 of the first cover 111 and the first light guide plate 112. The second backlight unit 12 includes a second cover 121, a second light guide plate 122, a second light source 123 and at least one second optical film 124. The second cover 121 has a third surface S3 and a fourth surface S4 opposite to each other, wherein the third surface S3 of the second cover 121 faces the first surface S1 of the first cover 111. The second light guide plate 122 is disposed on the third surface S3 of the second cover 121. The second light source 123 is disposed on the third surface S3 of the second cover 121 and on a side of the second light guide plate 122. The at least one second optical film 124 is disposed between the first backlight unit 11 and the second light guide plate 122. The display panel 13 is disposed on the second surface S2 of the first cover 111 and thereby being disposed on the backlight module LM.

In the embodiment, the at least one first optical film 114 of the first backlight unit 11 is, for example, an inverse prism sheet. The inverse prism sheet is a substrate on which a plurality of strip-like prism columns (not shown) are disposed, and the strip-like prism columns are arranged toward the first light guide plate 112, but the invention is not limited thereto. In the embodiment, the number/quantity of the at least one second optical film 124 of the second backlight unit 12 is, for example, plural. These second optical films 124 include one of the diffusion sheet, prism sheet and color filter sheet, but the invention is not limited thereto. Specifically, the invention does not limit the number/quantity and type of the first optical film 114 and the second optical film 124. The number/quantity and type of the first optical film 114 and the second optical film 124 can be adjusted depending on the actual needs.

The structure of the backlight module LM of the embodiment will be described in detail below.

In the embodiment as shown in FIG. 2, the first light source 113 and the second light source 123 are, for example, disposed on the same side of the backlight module LM. Specifically, the first light guide plate 112 of the embodiment includes a first side surface 1121 and a second side surface 1122 opposite to each other and a first light exit surface 1123 and a first back surface 1124 opposite to each other. The first side surface 1121 and the second side surface 1122 are connected between the first light exit surface 1123 and the first back surface 1124. In the embodiment, the first side surface 1121 is, for example, the light entrance surface of the first light guide plate 112; that is, the first light source 113 is disposed beside the first side surface 1121 of the first light guide plate 112. The second light guide plate 122 of the embodiment includes a third side surface 1221 and a fourth side surface 1222 opposite to each other and a second light exit surface 1223 and a second back surface 1224 opposite to each other. The third side surface 1221 and the fourth side surface 1222 are connected between the second light exit surface 1223 and the second back surface 1224. In the embodiment, the third side surface 1221 is, for example, the light entrance surface of the second light guide plate 122; that is, the second light source 123 is disposed beside the second side surface 1221 of the second light guide plate 122.

As shown in FIG. 2, the first cover 111 of the embodiment includes a top wall W1, a first side wall W2 extending from the top wall W1 toward the second cover 121, and a cover wall W3 extending from the second side wall W2 and parallel to the top wall W1. The top wall W1 of the first cover 111 includes the above-described first surface S1 and the second surface S2. The second cover 121 includes a bottom wall W4, a second side wall W5 extending from the bottom wall W4 toward the first cover 111, and a cover wall W6 extending from the second side wall W5 and parallel to the bottom wall W4. The bottom wall W4 of the second cover 121 includes the above-described third surface S3 and the fourth surface S4. In the embodiment, the cover wall W6 of the second cover 121 covers at least a portion of the second light source 123 and the second light guide plate 122. Specifically, the cover wall W6 of the second cover 121 is located between the first light source 113 and the second light source 123 and also between a portion of the first light guide plate 112 and a portion of the second light guide plate 122. The cover wall W6 of the embodiment is used to separate the first light source 113 and the second light source 123 so as to effectively prevent the light emitted from the first light source 113 and the light emitted from the second light source 123 from interfering with each other.

As shown in FIG. 2 and FIG. 3, the first backlight unit 11 of the embodiment further includes a first frame 115. The first frame 115 is located between the first side wall W2 of the first cover 111 and the first light guide plate 112, and the first frame 115 surrounds the first light guide plate 112. In the embodiment, the first frame 115 is, for example, a □-shaped frame and surrounds the four edges of the first light guide plate 112. The first light source 113 is located between the first frame 115 and the first light guide plate 112. The first frame 115 is used to support the first light source 113, and the first frame 115 can further prevent light leakage thereby ensuring that the light emitted from the first light source 113 can enter into the first light guide plate 112 through the first side surface 1121 (the light entrance surface). The first frame 115 also increases the structural strength of the first backlight unit 11. In other embodiments, the first frame 115 is, for example, a ⊓-shaped frame and surrounds the three edges of the first light guide plate 112. The opening of the ⊓-shaped frame is located at the first light source 113 and therefore the first light source 113 is located between the first side wall W2 of the first cover 111 and the first light guide plate 112. The ⊓-shaped first frame 115 can also increase the structural strength of the first backlight unit 11. In other embodiments, the ⊓-shaped first frame 115 can be integrally formed with the first cover 111. The second backlight unit 12 of the embodiment further includes a second frame 125. The second frame 125 is located between the second side wall W5 of the second cover 121 and the second light guide plate 122, and the second frame 125 surrounds the second light guide plate 122. In the embodiment, the second frame 125 is, for example, a □-shaped frame and surrounds the four edges of the second light guide plate 122. The second light source 123 is located between the second frame 125 and the second light guide plate 122. The second frame 125 is used to support the second light source 123, and the second frame 125 can further prevent light leakage thereby ensuring that the light emitted from the second light source 123 can enter into the second light guide plate 122 through the third side surface 1221 (the light entrance surface). The second frame 125 also increases the structural strength of the second backlight unit 12. In other embodiments, the second frame 125 is, for example, a ⊓-shaped frame and surrounds the three edges of the second light guide plate 122. The opening of the ⊓-shaped frame is located at the second light source 123 and therefore the second light source 123 is located between the second side wall W5 of the second cover 121 and the second light guide plate 122. The ⊓-shaped second frame 125 can also increase the structural strength of the second backlight unit 12. In other embodiments, the ⊓-shaped second frame 125 can be integrally formed with the second cover 121.

As shown in FIG. 2, the first backlight unit 11 of the embodiment further includes a first adhesive element 116. The first adhesive element 116 is located between the first light source 113 and the top wall W1 of the first cover 111 and between the first light guide plate 112 and the top wall W1 of the first cover 111. Specifically, the first light source 113 and the first light guide plate 112 are adhered and fixed to the first surface S1 of the top wall W1 of the first cover 111 by the first adhesive element 116, respectively. In the embodiment, the first adhesive element 116 is, for example, an adhesive tape, but the invention is not limited thereto. In one embodiment, the first light source 113 is, for example, a light emitting diode (LED) light bar having a plurality of LEDs and a circuit board (not shown); wherein the LEDs are disposed on the circuit board. The first adhesive element 116 is adhered between the circuit board of the LED light bar and the first surface S1 of the top wall W1 of the first cover 111.

The second backlight unit 12 of the embodiment further includes a reflective sheet 126 and a second adhesive element 127. The reflective sheet 126 is disposed between the third surface S3 of the second cover 121 and the second light guide plate 122, that is, between the bottom wall W4 of the second cover 121 and the second light guide plate 122. The second adhesive element 127 is located between the second light source 123 and the bottom wall W4 of the second cover 121, between the second light guide plate 122 and the bottom wall W4 of the second cover 121, and between the bottom wall W4 of the second cover 121 and the reflective sheet 126. Specifically, the second light source 123, the second light guide plate 122 and the reflective sheet 126 are adhered and fixed to the third surface S3 of the bottom wall W4 of the second cover 121 by the second adhesive element 127, respectively. In the embodiment, the second adhesive element 127 is, for example, an adhesive tape, but the invention is not limited thereto. In one embodiment, the second light source 123 is, for example, a LED light bar having a plurality of LEDs and a circuit board (not shown); wherein the LEDs are disposed on the circuit board. The second adhesive element 127 is adhered between the circuit board of the LED light bar and the third surface S3 of the bottom wall W4 of the second cover 121.

Figure 4:
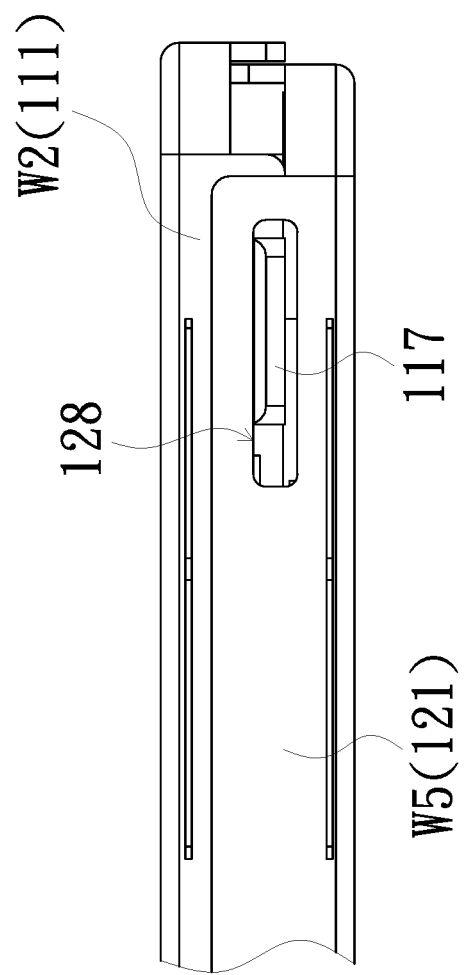
FIG. 4 is a schematic partial side view of the display device shown in FIG. 1.

FIG. 4 is a schematic partial side view of the display device 1 shown in FIG. 1. Please refer to FIG. 2, FIG. 3 and FIG. 4 together. The first backlight unit 11 of the embodiment further includes at least one first engaging element 117. The first engaging element 117 is disposed on the first cover 111. In the embodiment, the first engaging element 117 is, for example, disposed on the first side wall W2 of the first cover 111, but the invention is not limited thereto. The second backlight unit 12 of the embodiment further includes at least one second engaging element 128. The second engaging element 128 is disposed on the second cover 121. In the embodiment, the second engaging element 128 is, for example, disposed on the second side wall W5 of the second cover 121, but the invention is not limited thereto. The first engaging element 117 and the second engaging element 128 of the embodiment are two structures mutually matched with each other. Specifically, by engaging the first engaging element 117 and the second engaging element 128 to each other, the first backlight unit 11 and the second backlight unit 12 are assembled into a backlight module LM. In addition, by disengaging the first engaging element 117 and the second engaging element 128 from each other, the first backlight unit 11 and the second backlight unit 12 are separated from each other. In the embodiment, the first engaging element 117 is, for example, a convex block, and the second engaging element 128 is, for example, a slot matching the convex block. The first backlight unit 11 and the second backlight unit 12 are assembled with each other by engaging the convex block and the slot with each other. It is to be noted that the display device 1 of the invention does not limit the structure of the first engaging element 117 and the second engaging element 128 so long as the mutual engagement can be achieved.

Figure 5:
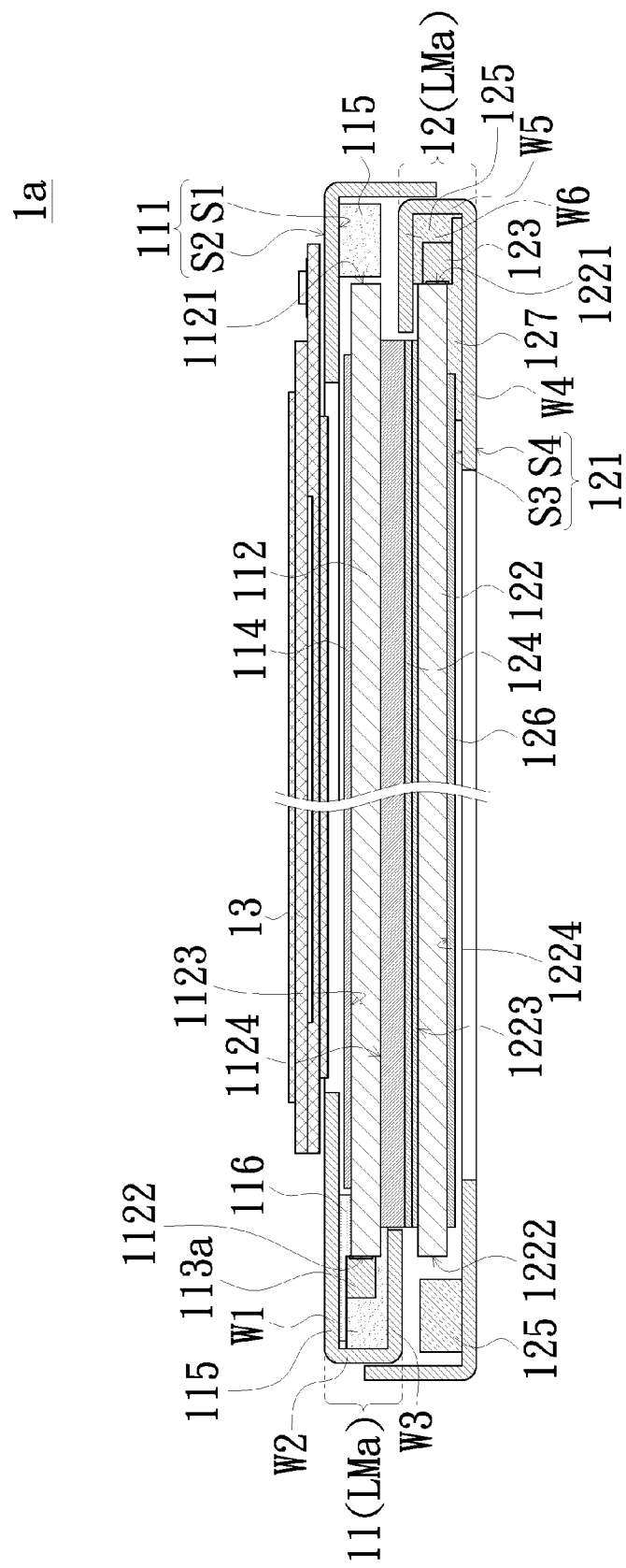
FIG. 5 is a schematic cross-sectional view of a display device in accordance with another embodiment of the invention.

FIG. 5 is a schematic cross-sectional view of a display device in accordance with another embodiment of the invention. The display device 1a of the embodiment is similar to the display device 1 shown in FIG. 2 except that the backlight module LMa of the embodiment and the backlight module LM shown in FIG. 2 have different structures; that is, the first light source 113a and the second light source 123 of the embodiment are arranged on different sides of the backlight module LMa. Specifically, in the embodiment, the second side surface 1122 of the first light guide plate 112 is, for example, the light entrance surface of the first light guide plate 112. That is, the first light source 113a is disposed beside the second side surface 1122 of the first light guide plate 112 and the second light source 123 is disposed beside the third side 1221 (the light entrance surface of the second light guide plate 122) on a side different from the second side surface 1122. In addition, in the embodiment, the first light source 113a is located in the accommodating space formed by the top wall W1, the first side wall W2 and the cover wall W3 of the first cover 111; and the second light source 123 is located in the accommodating space formed by the bottom wall W4, the second side wall W5 and the cover wall W6 of the second cover 121. With this structural design to dispose the first light source 113a and the second light source 123 on different sides of the backlight module LMa, the light emitted from the first light source 113a and the light emitted from the second light source 123 can be effectively prevented from interfering with each other. In other embodiments, by disposing the first light source beside the first side surface 1121 of the first light guide plate 112 and disposing the second light source beside the fourth side surface 1222 (the light entrance surface of the second light guide plate 122) on a side different from the first side surface 1121, the above-described effect is also achieved.

Figure 6A:
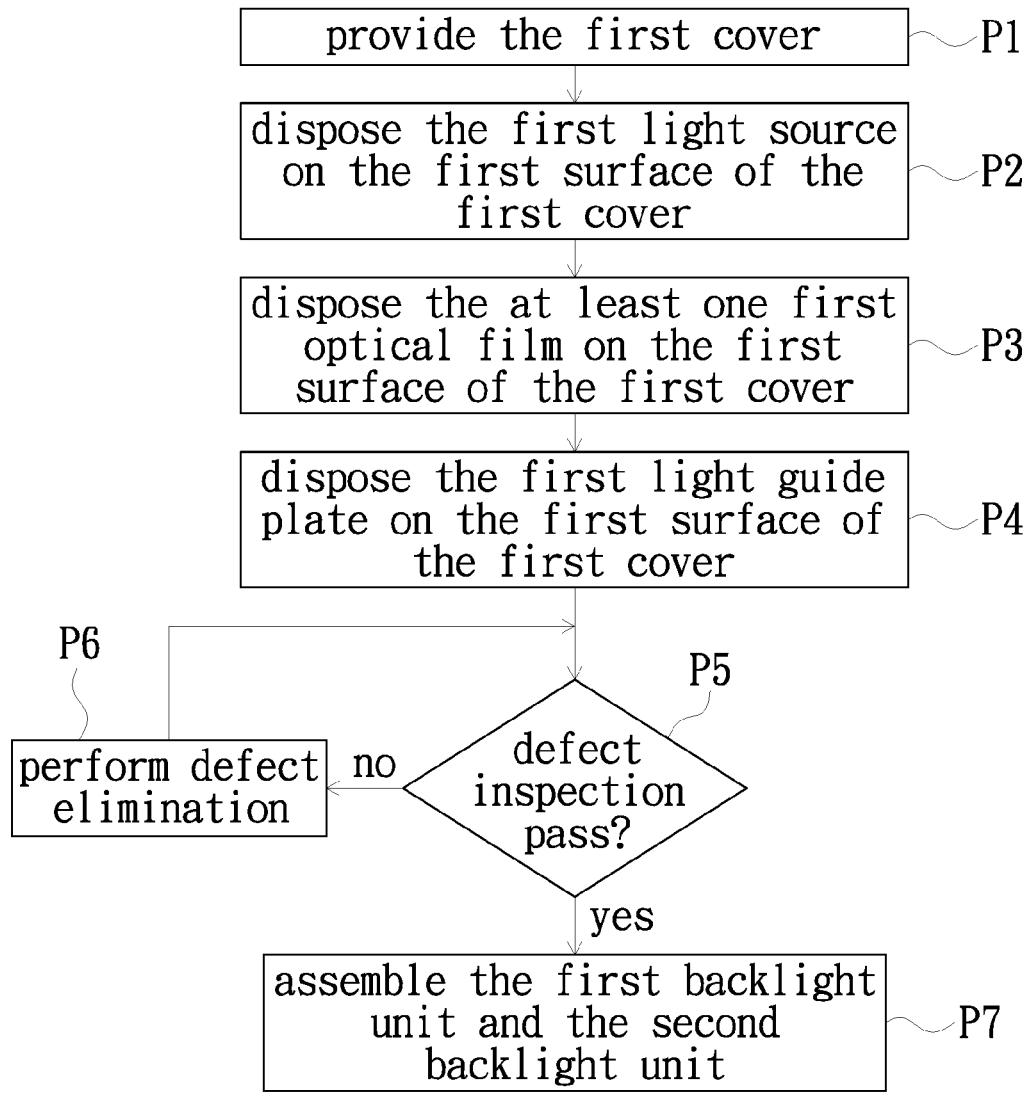
FIG. 6A is a flow chart of the method for assembling the first backlight unit shown in FIG. 2.
Figure 6B:
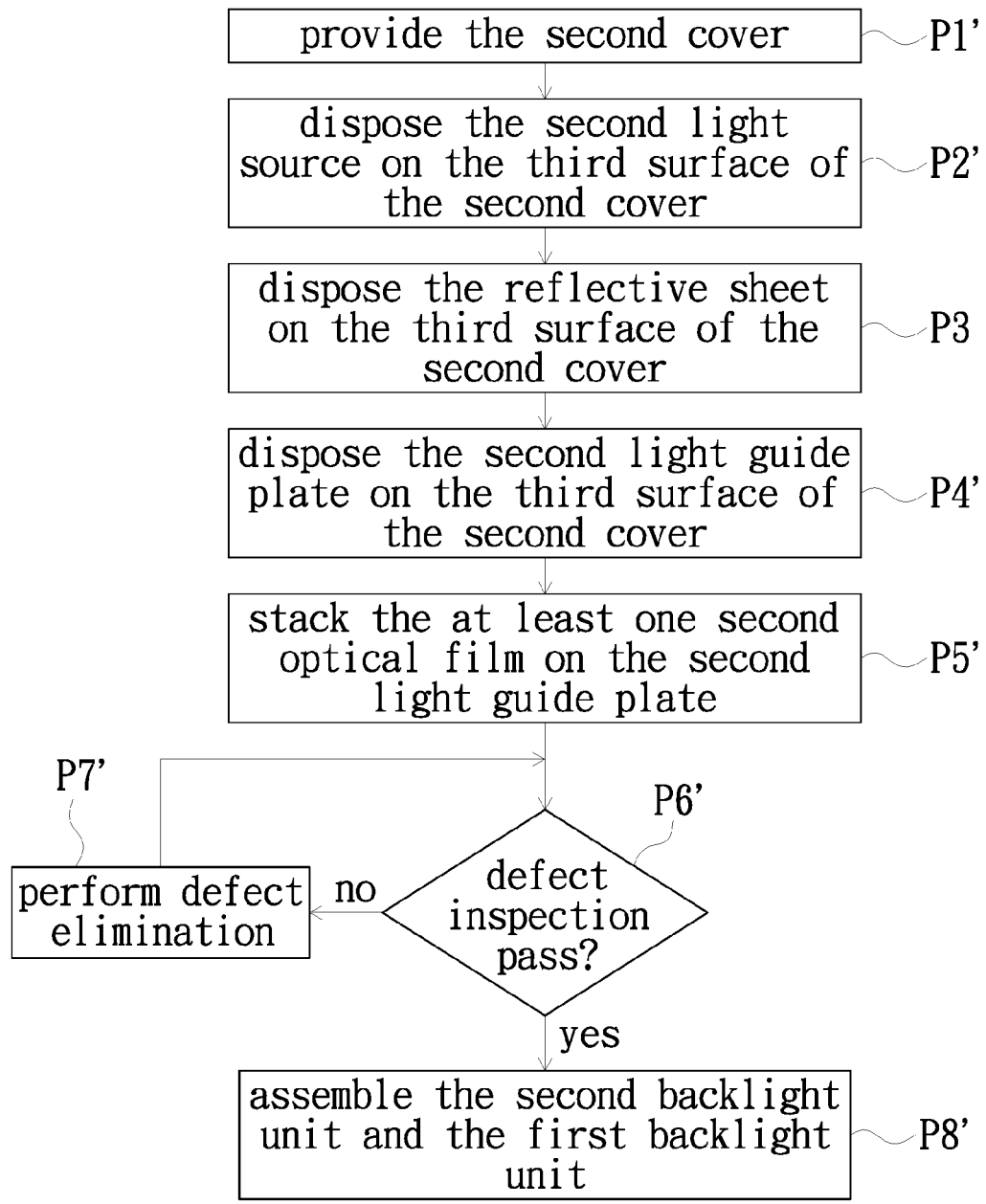
FIG. 6B is a flow chart of the method for assembling the second backlight unit shown in FIG. 2.

FIG. 6A is a flow chart of the method for assembling the first backlight unit shown in FIG. 2. FIG. 6B is a flow chart of the method for assembling the second backlight unit shown in FIG. 2. As shown in FIG. 6A, first, step P1: providing the first cover 111. Thereafter, step P2: disposing the first light source 113 on the first surface S1 of the first cover 111. For example, the first light source 113 is adhered and fixed to the first surface S1 of the first cover 111 by the first adhesive element 116. Thereafter, step P3: disposing the at least one first optical film 114 on the first surface S1 of the first cover 111. Thereafter, step P4: disposing the first light guide plate 112 on the first surface S1 of the first cover 111. For example, the first light guide plate 112 is adhered and fixed to the first surface S1 of the first cover 111 by the first adhesive element 116. At this time, the at least one first optical film 114 is limited in the gap between the first light guide plate 112 and the first surface S1 of the first cover 111. Thereafter, step P5: performing a defect inspection. If the first backlight unit 11 does not pass the defect inspection, thereafter step P6: performing defect elimination. Alternatively, if the first backlight unit 11 passes the defect inspection, thereafter step P7: assembling the first backlight unit 11 and the second backlight unit 12.

As shown in FIG. 6B, first, step P1': providing the second cover 121. Thereafter, step P2': disposing the second light source 123 on the third surface S3 of the second cover 121. For example, the second light source 123 is adhered and fixed to the third surface S3 of the second cover 121 by the second adhesive element 127. Thereafter, step P3': disposing the reflective sheet 126 on the third surface S3 of the second cover 121. For example, the reflective sheet 126 is adhered and fixed to the third surface S3 of the second cover 121 by the second adhesive element 127. Thereafter, step P4': disposing the second light guide plate 122 on the third surface S3 of the second cover 121. For example, the second light guide plate 122 is adhered and fixed to the third surface S3 of the second cover 121 by the second adhesive element 127. Thereafter, step P5': stacking the at least one second optical film 124 on the second light guide plate 122. Thereafter, step P6': performing a defect inspection. If the second backlight unit 12 does not pass the defect inspection, thereafter step P7': performing defect elimination. Alternatively, if the second backlight unit 12 passes the defect inspection, thereafter step P8': assembling the second backlight unit 12 and the first backlight unit 11.

In summary, the backlight module and the display device of the embodiment of the invention have at least one of the following advantages. The backlight module of the invention has a first backlight unit and a second backlight unit, and the first backlight unit is detachably disposed with the second backlight unit. With this structural design, a defect inspection (for example, an inspection for dust and stain) can be performed after the first backlight unit and the second backlight unit are assembled to each other. Namely, the backlight module of the embodiment of the invention can inspect the defects at any time during the assembling process, so as to avoid the high manufacturing loss rate caused by the repeated dismantling of the components.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A backlight module, comprising:
a first backlight unit comprising a first cover, a first light guide plate, a first light source and at least one first optical film, wherein the first cover has a first surface and a second surface opposite to each other, the first light guide plate is disposed on the first surface, the first light source is disposed on the first surface and located on a side of the first light guide plate, and the at least one first optical film is disposed between the first surface and the first light guide plate; and
a second backlight unit detachably disposed with the first backlight unit and comprising a second cover, a second light guide plate, a second light source and at least one second optical film, wherein the second cover has a third surface and fourth surface opposite to each other, the third surface faces the first surface, the second light guide plate is disposed on the third surface, the second light source is disposed on the third surface and located on a side of the second light guide plate, and the at least one second optical film is disposed between the first backlight unit and the second light guide plate.

2. The backlight module according to claim 1, wherein the first cover comprises a top wall and a first side wall extending from the top wall toward the second cover, the top wall comprises the first surface and the second surface, the second cover comprises a bottom wall and a second side wall extending from the bottom wall toward the first cover, and the bottom wall comprises the third surface and the fourth surface.

3. The backlight module according to claim 2, wherein the first backlight unit further comprises a first frame, the first frame is located between the first side wall and the first light guide plate, and the first frame surrounds the first light guide plate, wherein the second backlight unit further comprises a second frame, the second frame is located between the second side wall and the second light guide plate, and the second frame surrounds the second light guide plate.

4. The backlight module according to claim 2, wherein the first backlight unit further comprises at least one first engaging element, the at least one first engaging element is disposed on the first side wall of the first cover, the second backlight unit further comprises at least one second engaging element matching with the first engaging element, the at least one second engaging element is disposed on the second side wall of the second cover, and the first backlight unit is detachably disposed with the second backlight unit by engaging the at least one first engaging element and the at least one second engaging element with each other.

5. The backlight module according to claim 2, wherein the second cover further comprises a cover wall extending from the second side wall and parallel to the bottom wall, and the cover wall covers at least a portion of the second light source and the second light guide plate.

6. The backlight module according to claim 1, wherein the first light source and the first light guide plate are adhered and fixed to the first surface of the first cover by a first adhesive element, respectively.

7. The backlight module according to claim 1, wherein the second backlight unit further comprises a reflective sheet, and the reflective sheet is disposed between the third surface of the second cover and the second light guide plate.

8. The backlight module according to claim 7, wherein the second light source, the second light guide plate and the reflective sheet are adhered and fixed to the third surface of the second cover by a second adhesive element, respectively.

9. The backlight module according to claim 1, wherein the at least one first optical film comprises a reverse prism sheet.

10. The backlight module according to claim 1, wherein the at least one second optical film is one of a diffusion sheet, a prism sheet and a color filter sheet.

11. The backlight module according to claim 1, wherein the first light guide plate has a first side surface and a second side surface opposite to each other, the second light guide plate has a third side surface and a fourth side surface opposite to each other, the first side surface and the third side surface are located on the same side, the second side surface and the fourth side surface are located on the same side, the first light source is located beside the first side surface, and the second light source is located beside the fourth side surface.

12. A display device, comprising:
a first backlight unit comprising a first cover, a first light guide plate, a first light source and at least one first optical film, wherein the first cover has a first surface and a second surface opposite to each other, the first light guide plate is disposed on the first surface, the first light source is disposed on the first surface and located on a side of the first light guide plate, and the at least one first optical film is disposed between the first surface and the first light guide plate;
a second backlight unit detachably disposed with the first backlight unit and comprising a second cover, a second light guide plate, a second light source and at least one second optical film, wherein the second cover has a third surface and fourth surface opposite to each other, the third surface faces the first surface, the second light guide plate is disposed on the third surface, the second light source is disposed on the third surface and located on a side of the second light guide plate, and the at least one second optical film is disposed between the first backlight unit and the second light guide plate; and a display panel disposed on the second surface of the first cover.

\* \* \* \* \*